Figure 5:
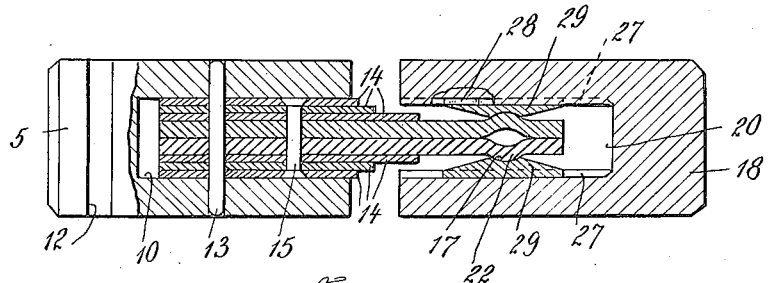

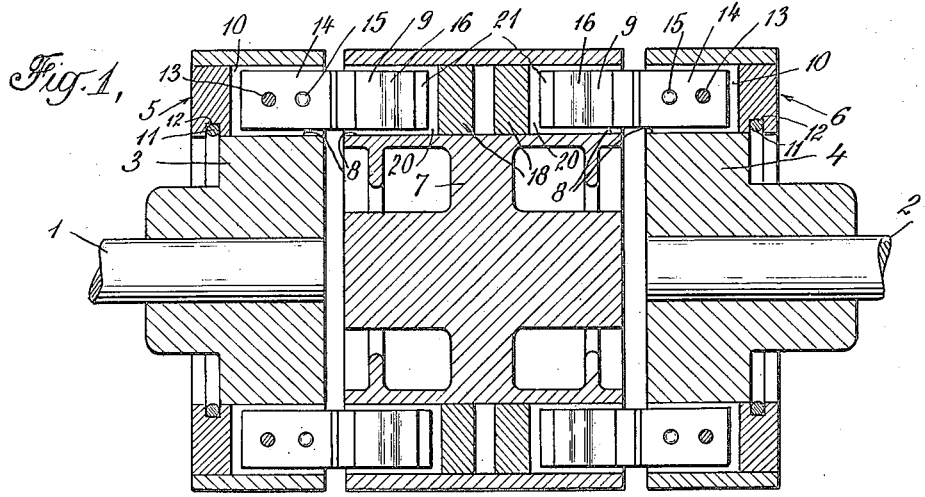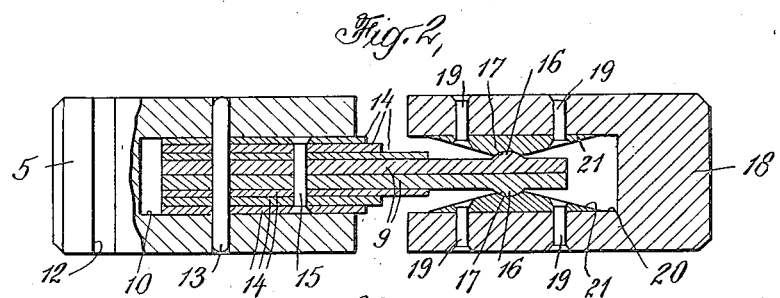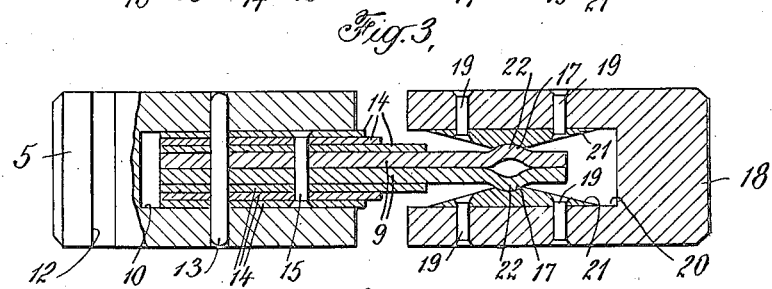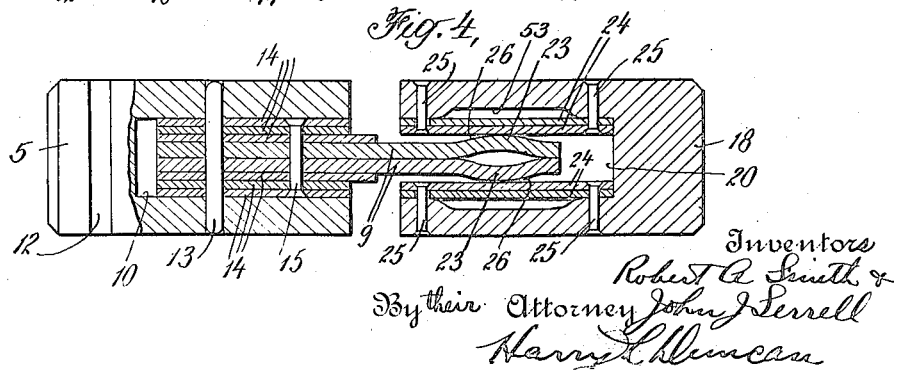

UNITED STATES PATENT OFFICE.

ROBERT A. SMITH, OF MAHWAH, AND JOHN J. SERRELL, OF ELIZABETH, NEW JERSEY, ASSIGNORS TO SMITH AND SERRELL, OF MAHWAH, NEW JERSEY, A COPARTNERSHIP CONSISTING OF SAID SMITH AND SAID SERRELL.

FLEXIBLE POWER COUPLING.

1,403,272.  Specification of Letters Patent.  Patented Jan. 10, 1922.

Application filed February 7, 1920. Serial No. 356,980.

*To all whom it may concern:*

Be it known that we, ROBERT A. SMITH, of Mahwah, Bergen County, State of New Jersey, and JOHN J. SERRELL, of Elizabeth, Union County, State of New Jersey, citizens of the United States, have made a new and useful Invention Relating to Flexible Power Couplings, of which the following is a specification, taken in connection with the accompanying drawing, which forms part of the same.

This invention relates especially to flexible couplings for connecting shafts or other rotary members so as to compensate for the usual slight lack of concentric and angular alignment of the two members and also preferably allow a considerable degree of resilient or cushioning action between them while minimizing undesirable localized pressure and wear between the resilient and other contacting coupling elements. For this purpose the cooperating coupling members, which may comprise an interposed floating ring coupling member in some cases, may be formed with a series of circumferentially spaced or other holes or recesses to accommodate coupling pins or elements located in these holes and extending between adjacent coupling members. These coupling pins or elements may comprise a connector preferably of suitably resilient character which may be united to or formed integral with the keeper or pin end forming one end of the coupling element and in some cases preferably has a loose or swivelling connection therewith, while the projecting reduced area rocking connector head which may be provided on the connector may form a definitely located equalizing bearing portion cooperating with the keeper or pin end at the other end of the coupling element and preferably having resilient contact therewith as by interposed contact springs connected to either one of these cooperating parts on one or both sides of the connector head. In this way the connector may have a relatively loose socketed or flexible equalizing bearing upon the cooperating portion of the keeper or pin end so that undesirable wear is minimized, since the working pressure is substantially normal and will be distributed between these parts and objectionable end thrust may be practically eliminated between these members which may be pivotally or other wise loosely connected, if desired.

In the accompanying drawing showing in a somewhat diagrammatic way a number of illustrative embodiments of this invention, Fig. 1 is a longitudinal section through cooperating coupling members and the coupling pins or elements which may be used in connection therewith; and Figs. 2 to 8 are enlarged sectional views of various forms of coupling pins or elements which are taken substantially at right angles to the plane of the coupling pins shown in Fig. 1.

The cooperating coupling members which may flexibly and resiliently connect two rotary mechanical elements such as the shafts 1, 2, may comprise the flanged coupling members 3, 4, and also in some cases an interposed flexible floating ring coupling member 7, these coupling members being formed with any suitable cooperating or aligned holes or recesses, such as the recesses 8 which may, if desired, be circumferentially spaced around their peripheries so as to be substantially parallel to the axes of the coupling members and of such size as to accommodate suitable coupling pins or elements. These coupling elements may bridge the gaps between the coupling members and operatively connect them while allowing the desired slight play and preferably also resilient yield under operating conditions. As indicated in Figs. 1 and 2 the coupling pins or elements may comprise an integral or other pin end or keeper 5 formed with a keeper socket 10 in which may be pivotally or otherwise mounted a connector of suitable construction to enter the socket 20 in the cooperating keeper or pin end 18 and preferably exert the desired operating pressure thereon without objectionable end thrust. The connector may, if desired, be of resilient character and may be formed of multiple strip or built up construction comprising the resilient or spring steel strips 9 while shorter length strips 14 may be arranged on each side of these main or central connector strips and if desired be riveted or otherwise secured thereto as by one or more rivets 15. The reduced end of the connector which enters the other keeper or pin end is preferably formed with an enlarged or rocking connector head 16 which may be of substantially convex or spherical form so as to advantageously cooperate with a bearing socket 17 which may be formed in the keeper in any suitable way as by securing thereto bearing supports, such as 21, by anchor pins or rivets 19. In this way where a cylindrical or substantially spherical rocking head of small area is formed on the connector the working pressure is transmitted to the cooperating pin end or the bearing therein in a substantially normal direction, so that regardless of any slight bending of the connector end objectionable end thrust between these parts or the connected coupling members is substantially eliminated or minimized. Fig. 3 shows another generally similar arrangement in which the rocking connector head is formed by forcing or stamping out integral projections from the main resilient or other connector strips 9 so as to form the relatively small area cylindrical or substantially spherical connector head 22 which may, if desired, cooperate directly with the keeper socket or with the bearing sockets 17 which may be formed in bearing supports, such as 21, riveted or otherwise secured to the keeper.

As shown in Fig. 4, the connector strips 9 may in some cases be formed with a rocking connector head or bearing surface 26 of somewhat greater radius which may engage the socket in the cooperating keeper or pin end or may engage a special contact surface or contact spring portion which may be secured or mounted within the keeper on one or both sides of the connector head. As shown in Fig. 4 the contact springs 24 may be secured within the keeper socket by one or more rivets 25 passing through each of the springs and having sufficiently loose engagement therewith at least at one end to allow the resilient flexure of the springs under operating conditions, recesses or cutaway portions such as 53 being provided adjacent the central portions of these contact springs so that their sole engagement with the keeper is preferably at the supporting blocks or portions adjacent the ends of this socket. Under service conditions when power is being transmitted by such a pin it tends to flex the contact springs against which it bears most heavily so that the pressure on the contact springs on the other side is greatly reduced or sometimes removed, thus minimizing spring holding pressure and wear on the connector head and the contact portions or elements of the keeper or pin end with which the head cooperates.

Fig. 5 shows an arrangement in which the swivellingly or pivotally mounted resilient connector may be formed with an integral rocker head 22 of cylindrical or preferably of substantially spherical form which may as indicated engage a corresponding bearing socket 17 in each of the slidingly mounted bearing supports 29. These bearing supports or slides may be mounted in guideways 27 cut in the cooperating keeper 17 so that ample endwise movement can thus take place between the slides and keeper to minimize the sliding movement between the keeper and the hole in the coupling member with which it cooperates. This arrangement also facilitates assembly of the coupling pin since the bearing slides may be arranged on each side of the connector head and inserted or forced into the guideways in the keeper before the parts are assembled.

Figure 6:
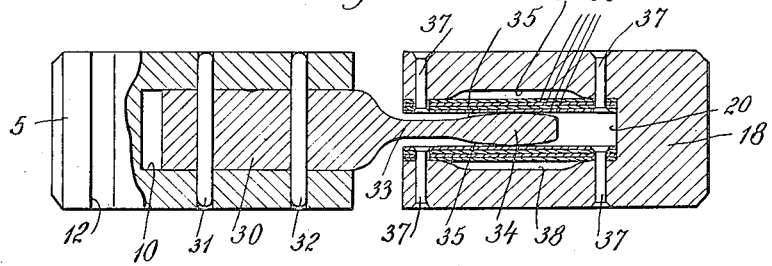
Figure 7:
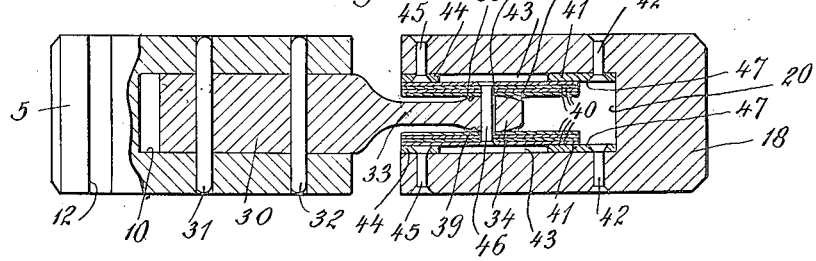
Figure 8:
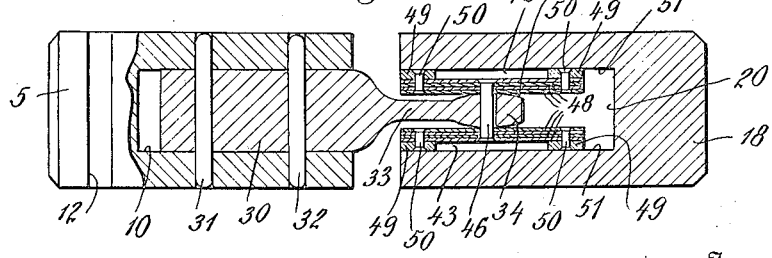

Fig. 6 shows another arrangement in which the connector may be of integral construction comprising the body or supporting end 30 which may fit substantially tightly within the socket or slot 10 in the keeper 5 to which the connector may be united by one or more securing pivots or pins 31, 32 and of course where several such pins are used the swivelling movement between the connector and keeper is correspondingly reduced or eliminated. The connector which may be formed of tempered spring steel or other suitable metal may have a reduced neck 33 entering the socket of the other keeper and a rocking head 34 of somewhat greater thickness may be provided on the free end of the connector so as to engage the keeper socket 20 or special resilient or other contact members which may be interposed between these parts. As indicated a series of contact springs 36 may be used and secured to the keeper by one or more anchor pins or rivets 37 holding at least one end of each of the springs against contact blocks or portions of the keeper which is formed with cut-away portions 38 adjacent the central parts of these contact springs so as to allow ample resilient yield thereof. Under service conditions the curved or cylindrical contact faces 35 of the connector head may have substantially normal engagement with the contact springs on the side against which the head presses most strongly so that there is no substantial chance of objectionable end thrust under these conditions. In the Fig. 7 construction the connector is also shown as integral and as formed with an enlarged head 34 having locking or curved cylindrical surface 55 on one or both sides thereof so as to give localized and substantially normal contact with the keeper or interposed cushioning spring contact members which may be used, if desired. In this case the contact springs 40 are shown as loosely connected to the head 34 of the connector as by the connecting pivot pin or rivet 46 which passes through these springs and also through a somewhat loose fit hole or slot 54 in the connector head so that ample angular movement is allowed between these parts. It is desirable to provide supporting blocks or portions on the keeper to engage the contact springs adjacent their ends and for this purpose the contact blocks 41 may be riveted to the keeper by the pins or rivets 42 to form the contact surfaces 47 adjacent the inner end of the keeper socket 20, while the other ends of these contact springs may engage the contact blocks 44 secured to the keeper by the rivets 45. Fig. 8 shows another modification in which the contact springs 48 are similarly secured to the connector head 34 which may, if desired, have rocker or curved surfaces 55 on one or both faces thereof. The connecting pivot pin or rivet 46 may be used for this purpose and may pass loosely through the springs or connector head or both to allow ample freedom of movement between these parts, while, if desired, contact blocks such as 49 may be secured to one or both ends of these multiple contact springs as by the rivets 50 so as to give ample space or clearance 43 adjacent the central parts of these contact springs to provide the desired degree of resilient yield between these parts. The contact springs and blocks can thus move longitudinally with the connector head and the socket 20 in the keeper 18 is formed amply deep for this purpose, so that the contact surfaces 51 extend beyond the contact blocks 49 in one or both directions to allow the desired degree of end play between the keeper and connector. Any of the connectors referred to in this paragraph may of course be used in connection with only a single securing pivot which would swivellingly connect the body of the connector to the keeper 5 in which it is located. The swivelling movement between the parts would under these conditions usually be controlled or sufficiently limited by the engagement of some of the parts of the coupling with the holes or recesses in the coupling members.

Of course these coupling pins may in many cases be used in double type couplings, such as are shown in Fig. 1 in which the keeper at one end of each coupling pin is preferably held in longitudinal position by a retainer spring or ring 11 which may engage a depression 12 in the keeper 5. The keeper 18 at the other end of the coupling pin may of course engage the interposed floating ring coupling member 7 in this type of arrangement while another keeper 6 is similarly held in the flanged coupling member 4 so that its connector 9 bridges across the space between this flanged coupling member and the floating ring in which its cooperating keeper 18 is located. If desired, of course, a single type coupling may be formed with such coupling pins in which case as is well known, the interposed floating ring coupling member is omitted and each coupling pin may bridge directly across from one flanged coupling member to the other, provision being made in such cases to allow sufficient endwise movement between the connector end and its cooperating keeper in some of the types of coupling pins above described.

This invention has been described in connection with a number of illustrative embodiments, forms, proportions, parts, shapes, materials, arrangements, methods of manufacture and use, to the details of which disclosure the invention is not of course to be limited, since what is claimed as new and what is desired to be secured by Letters Patent is set forth in the appended claims:

1. In yieldable flexible couplings, flanged coupling members adapted to be connected to shafts, an interposed cooperating floating ring coupling member, there being a series of circumferentially spaced cooperating cylindrical holes in said coupling members and coupling pins arranged in said holes to give flexible and resilient connection between the said coupling members, said coupling pins each comprising a keeper formed with a socket, a resilient connector pivotally mounted in said socket and formed of multiple spring strips, a rocking head on the free end of said connector, a keeper formed with a socket in which said connector head normally operates and contact springs mounted in engagement with the head of said connector and secured within the socket of the cooperating keeper to give additional resilient yielding between said connector head and said keeper.

2. In yieldable flexible couplings, flanged coupling members adapted to be connected to shafts, there being a series of circumferentially spaced cooperating cylindrical holes in said coupling members and coupling pins arranged in said holes to give flexible and resilient connection between the said coupling members, said coupling pins each comprising a keeper formed with a socket, a resilient connector mounted in said socket and formed of multiple spring strips, a head on the free end of said connector, a keeper formed with a socket in which said connector head normally operates.

3. In yieldable flexible couplings, coupling pins adapted to effect flexible and resilient connection between coupling members, said coupling pins each comprising an integral keeper formed with a socket, a resilient connector pivotally mounted in said socket and formed of multiple spring strips, an integral rocking head on the free end of said connector, an integral keeper formed with a socket in which said head normally operates and bridging contact springs mounted in engagement with both sides of the head of said connector and secured within the socket of the cooperating keeper to give additional resilient yielding between said connector head and said keeper.

4. In yieldable flexible couplings, coupling pins adapted to effect flexible and resilient connection between coupling members, said coupling pins each comprising a keeper formed with a socket, a resilient connector pivotally mounted in said socket, a rocking head on the free end of said connector, a keeper formed with a socket in which said connector head normally operates and bridging contact springs mounted in engagement with both sides of the head of said connector within the socket of the cooperating keeper to give additional resilient yielding between said connector head and said keeper.

5. In yieldable flexible couplings, coupling pins adapted to effect flexible and resilient connection between coupling members, said coupling pins each comprising a keeper formed with a socket, a resilient connector mounted in said socket, a rocking head on the free end of said connector, a keeper formed with a socket in which said connector head normally operates and bridging contact springs mounted in engagement with the head of said connector within the socket of the cooperating keeper to give additional resilient yielding between said connector head and said keeper while minimizing end thrust between them.

6. In yieldable flexible couplings, coupling pins adapted to effect flexible and resilient connection between coupling members, said coupling pins each comprising a keeper, a resilient connector pivotally connected to said keeper and formed of multiple spring strips, an integral rocking head on the free end of said connector, a keeper formed with a socket in which said connector head normally operates to exert substantially normal pressure thereon and contact springs cooperating with the head of said connector within the socket of the cooperating keeper.

7. In yieldable flexible couplings, coupling pins adapted to effect flexible and resilient connection between coupling members, said coupling pins each comprising a keeper, a resilient connector connected to said keeper and formed of multiple spring strips, a rocking head on the free end of said connector, a keeper formed with a socket in which said connector head normally operates to exert substantially normal pressure thereon.

8. In yieldable flexible couplings, coupling pins adapted to give flexible and resilient connection between coupling members, said coupling pins each comprising a keeper, a resilient connector pivotally mounted in said keeper and formed of multiple spring strips, an integral rocking head on the free end of said connector and a keeper formed with a socket in which said connector head normally operates.

9. In yieldable flexible couplings, coupling pins adapted to give flexible and resilient connection between coupling members, said coupling pins each comprising a keeper, a resilient connector mounted in said keeper and formed of spring strips, a head on the free end of said connector, and a keeper with which said connector head normally cooperates.

10. In yieldable flexible couplings, coupling pins adapted to removably cooperate with recesses in coupling members and each comprising keepers, a resilient spring steel connector having a supporting end swivellingly connected to one of said keepers and having a reduced area rocking head on the free end of said connector and normally operating within the other keeper, and cooperating spring contact members arranged on both sides of said connector head within said cooperating keeper to have reduced area contact substantially normal to said connector head and minimize end thrust and to allow end play between said head and keeper.

11. In yieldable flexible couplings, coupling pins adapted to removably cooperate with recesses in coupling members and each comprising keepers, a connector having a supporting end swivellingly connected to one of said keepers and having a rocking head on the free end of said connector and normally operating within the other keeper, and cooperating contact members arranged on both sides of said connector head within said cooperating keeper to have substantially normal contact with said connector head and minimize end thrust.

12. In yieldable flexible couplings, coupling pins adapted to removably cooperate with recesses in coupling members and each comprising keepers, a connector connected to one of said keepers and having a rocking head on the free end of said connector and normally operating within the other keeper, and a cooperating contact member arranged in connection with said connector head within said cooperating keeper to allow end play between said head and keeper.

13. In yieldable or flexible couplings, coupling pins adapted to removably cooperate with recesses in coupling members and each comprising keepers, a resilient connector swivellingly connected to one of said keepers and having on the free end of said connector a rocking connector head normally operating within the other keeper to have reduced area contact which is substantially normal to the engaging element of said keeper.

14. In flexible couplings, coupling pins adapted to removably cooperate with recesses in coupling members and each comprising keepers, a connector connected to one of said keepers and having on the free end of said connector, a rocking connector head normally operating within the other keeper to have reduced area contact which is substantially normal to the engaging element of said keeper.

15. In flexible couplings, flanged coupling members adapted to be connected to shafts and formed with cooperating series of holes and coupling pins in said holes and each comprising a connector having a reduced area rocking head on one end and a keeper within which the free end of said connector normally operates and a resilient contact member cooperating with the free end of said connector and located within the cooperating keeper.

16. In flexible couplings, flanged coupling members adapted to be connected to shafts and formed with cooperating series of holes and coupling pins in said holes and each comprising a connector having a reduced area rocking head on one end and a keeper within which the free end of said connector normally operates.

17. In flexible couplings, flanged coupling members adapted to be connected to shafts and formed with cooperating series of holes and coupling pins in said holes and each comprising a resilient connector having a reduced area rocking head on one end and a keeper within which the free end of said connector normally operates and a contact member cooperating with said connector head and located within the cooperating keeper to allow end play between said head and keeper.

18. In flexible couplings, flanged coupling members adapted to be connected to shafts and formed with cooperating series of holes and coupling pins in said holes and each comprising a connector having a reduced area rocking head on one end and a keeper within which the free end of said connector normally operates and having an extended contact surface cooperating with said connector head to allow end play between said head and keeper.

ROBERT A. SMITH.
JOHN J. SERRELL.